United States Patent [19]
Miyazato

[11] 3,860,539
[45] Jan. 14, 1975

[54] LINING AGENT FOR A TUBELESS PNEUMATIC TIRE

[76] Inventor: Teruhiko Miyazato, 18-7, Shiomi-cho, Sasebo, Japan

[22] Filed: July 14, 1972

[21] Appl. No.: 271,686

Related U.S. Application Data

[63] Continuation-in-part of Ser. No. 158,562, June 30, 1971, abandoned, which is a continuation of Ser. No. 757,433, Sept. 4, 1968, abandoned.

[30] Foreign Application Priority Data

Sept. 13, 1967 Japan.............................. 42-77828

[52] U.S. Cl........... 260/4 R, 152/347, 260/29.6 RB, 260/29.7 UA
[51] Int. Cl............................................. B60c 21/08
[58] Field of Search...... 152/347; 260/4 R, 29.7 UA

[56] References Cited

UNITED STATES PATENTS

| | | | |
|---|---|---|---|
| 3,042,098 | 7/1962 | Reinowski et al. ................. | 152/347 |
| 3,352,696 | 11/1967 | Wallace ............................. | 152/347 |
| 3,628,585 | 12/1971 | Pace .................................. | 152/347 |

FOREIGN PATENTS OR APPLICATIONS

| | | | |
|---|---|---|---|
| 544,670 | 4/1942 | Great Britain...................... | 152/347 |
| 626,959 | 7/1949 | Great Britain...................... | 152/347 |
| 629,330 | 9/1949 | Great Britain...................... | 152/347 |
| 753,831 | 8/1956 | Great Britain...................... | 152/347 |
| 964,476 | 7/1964 | Great Britain ..................... | 260/4 R |
| 394,978 | 7/1933 | Great Britain...................... | 152/347 |

*Primary Examiner*—John C. Bleutge
*Attorney, Agent, or Firm*—Armstrong, Nikaido & Wegner

[57] ABSTRACT

A tire lining agent capable of rendering a vehicle tire, typically an automobile tire, puncture proof, is provided. The tire lining agent, which is placed inside of the tire, is comprised of an aqueous dispersion having the following components:

a. an adhesive consisting essentially of an aqueous emulsion of polyvinyl acetate, polyacrylic acid ester, butadiene-acrylonitrile rubber, polychloroprene or polychloroprene copolymer, said aqueous emulstion being
   i. dispersible in water; and
   ii. adhesive to finely divided particulate solid rubber particles, 100 parts of said aqueous emulsion being present per 18 to 54 parts of water; and b. finely divided particulate solid rubber particles intimately dispersed in said aqueous dispersion, said finely divided particulate solid rubber particles having a particle size of from about 50 to 1200 microns and being present in an amount sufficient to seal a small puncture hole in said vehicle tire.

The finely divided particulate solid rubber particles (b) are, for example, pulverized waste tire or any other convenient rubber particulate matter meeting the above requirements. The finely divided particulate solid rubber particles (b) are unformly dispersed in the adhesive (a) through the incorporation in said tire lining agent of an effective amount of an anionic or nonionic surface active agent, said effective amount being sufficient to effect the uniform dispersion of said finely divided particulate rubber particles in said aqueous dispersion.

12 Claims, No Drawings

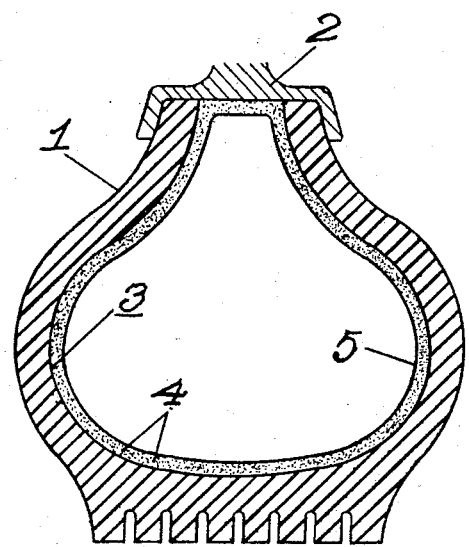

LINING AGENT FOR A TUBELESS PNEUMATIC TIRE

CROSS REFERENCE TO RELATED APPLICATIONS

This application is a continuation-in-part of my abandoned copending parent application, Ser. No. 158,562, filed June 30, 1971, which is in turn a continuation of my now abandoned grandparent application, Ser. No. 757,433, filed Sept. 4, 1968.

BACKGROUND OF THE INVENTION

Various types of tubeless tires have been proposed for the purpose of eliminating or reducing the possibility of punctures. For example, tires have been proposed having a lining of a sheet of sponge rubber or butyl rubber closely adhered to the overall inner surface of the tire. Further, tires have been provided with latex layer in the bodies thereof in a sandwich-like construction. These tubeless tires, however, have a number of disadvantages. First, the tires are relatively heavy and thereby cause motor cars equipped therewith to be dangerously unstable when running. In addition, although when holed, for example by a nail, the proposed tires are capable of temporarily preventing the puncture by the action of their own elastic force, the hole rapidly enlarges to such a degree that the elastic force can no longer withstand the pressure difference, leading to an actual puncture. In order to prevent such troubles, it has also been proposed to employ in tubeless tires high molecular viscous solutions of starch, cellulose or protein materials as auxiliary puncture-preventers. Such auxiliary viscous solutions, however, cannot completely stop up accidental holes, and fail to avoid puncture troubles because the solutions are not adhesive, so that the solutions, having entered the hole, may be forced out from the hole by the internal pressure in the tire. Thus, with conventional tubeless tires it has been difficult to achieve a complete and effective avoidance of puncture trouble, leading to a restriction in the practical use of such tubeless tires.

SUMMARY OF THE INVENTION

The present invention overcomes the disadvantages of the prior art by providing a tire lining agent comprising an aqueous dispersion of an adhesive which is dispersible in water and is adhesive to rubber, and rubber particles having a particle size of from about 50 to 1,200 microns dispersed therein, said rubber particles being present in an amount sufficient to seal a small puncture hole in a tire. Advantageously, the rubber particles are present in an amount of about 5 to 20 percent, preferably 7 to 18 percent, by weight based on said aqueous dispersion while the aqueous dispersion comprises about 18 to 54 parts by weight of water to 100 parts by weight of said adhesive. Most advantageously, said tire lining agent exhibits a viscosity of about 230 to 1350 cps at 21°C. Preferably, said adhesive mainly consists of aqueous emulsions of polyvinyl acetate, a polyacrylic acid ester such as polymethyl acrylate, butadiene-acrylonitrile rubber, polychloroprene or a copolymer of chloroprene.

In a preferred embodiment of the invention, said tire lining agent further comprises an anionic or nonionic surface active agent of a type and amount sufficient to facilitate the dispersion of said adhesive and said rubber particles, said amount preferably being about 0.1 to 1 percent, and most preferably 0.2 to 0.5 percent, by weight based on said aqueous dispersion of said adhesive with the rubber particles dispersed therein. Most suitable surface active agents are sodium dodecylbenzenesulfonate and polyoxyethylene lauryl ether.

In a further embodiment of the invention, the tire lining agent also includes an anti-freezing agent, preferably in an amount sufficient to lower the freezing point of said tire lining agent to about −20°C. Said antifreezing agent is preferably present in an amount of about 0.5 to 1.5 percent by weight based on said adhesive and consists of ethylene glycol or diethylene glycol.

The present invention also relates to a self-sealing tubeless pneumatic tire comprising a tubeless pneumatic tire and a fluid tire lining agent disposed on the interior thereof, said tire lining agent having the composition and characteristics set forth above.

Finally, the present invention is directed to a method of rendering a tire located on the rim having a valve device fitted in an airtight manner thereto resistant to puncturing which comprises introducing said fluid tire lining agent into the inflatable interior of said tire and inflating said tire to a predetermined pressure while maintaining said tire lining agent fluid therein, said tire lining agent being as set forth above.

BRIEF DESCRIPTION OF THE DRAWING

These and other features and advantages will become readily apparent from the following detailed description when taken into conjunction with the accompanying drawing wherein a cross-section of one embodiment of the invention is illustrated.

DETAILED DESCRIPTION OF THE INVENTION

The lining agent employed in the present invention can be readily produced by dispersing rubber particles in an aqueous dispersion of an adhesive which is dispersible in water. An aqueous dispersion rather than an organic solvent is employed in the invention since the latter would be dangerous at high temperatures and have a chemical eroding effect on rubber, the material of the tire. An even more important reason is the necessity of avoiding rapid solidification of the adhesive for keeping the lining agent fluid in the tire.

The adhesive to be employed in the lining agent may be any of the adhesives which are adhesive to rubber and dispersible in water. Typical examples thereof are adhesive mainly consisting of aqueous emulsions of polyvinyl acetate, a polyacrylic acid ester such as polymethyl acrylate, butadiene-acrylonitrile rubber, polychloroprene, a copolymer of chloroprene or the like. Adhesive emulsions of this type are commercially available under various trade names. For example, polyvinyl acetate emulsion type adhesives are available under trade names of TOABOND No. 2,100, No. 6,100, No. 40H, No. 71, etc. Composition of such series of TOABOND adhesives somewhat varies depending on the kind, but consists essentially of polyvinyl acetate, water and small amounts of additives including a surface active agent, a protective colloid and the like. TOABOND No. 2,100 consists of 52.0 percent of water, 37.5 percent of polyvinyl acetate (p.v.a.), 0.5 percent of polyoxyethylene sorbitan monolauric acid ester (p.s.l.) as a surface active agent, 5.0 percent of polyvinyl alcohol as a protective colloid and 5.0 percent of other additives (percent is shown by weight). TOABOND No. 6,100 consists of 58.0 percent of water, 31.5 percent of p.v.a., 0.5 percent of p.s.l., 5.0 percent polyvinyl alcohol and 5.0 percent of other additives. TOABOND No. 40H consists of 50.0 percent of water, 29.0 percent of p.v.a., 13.0 percent of poly-methyl acrylate, 1.0 percent of p.s.l., 5.0 percent of polyvinyl alcohol, 2.0 percent of other additives. TOABOND No. 71 consists of 40.0 percent of water, 49.5 percent of p.v.a., 0.5 percent of p.s.l., 5.0 percent of polyvinyl alcohol and 5.0 percent of other additives. The aqueous dispersion of the adhesive emulsion for use in the invention should be prepared in view of adhesiveness and fluidity. Generally, 18 – 54 percent by weight, based on the amount of the adhesive or the adhesive emulsion, of water is preferably employed.

The rubber particles to be dispersed in the adhesive carrier may be made of any rubber material; for example, pulverized waste tire rubber. The rubber particles have a particle size of from 50 to 1,200 microns and are suitably present in an amount of from 5 to 20 percent, preferably from 7 to 18 percent by weight of the composition. In order to facilitate the dispersion of the adhesive in the water and of the rubber particles in the resultant aqueous dispersion of adhesive, the tire lining agent preferably contains a small amount of a surface active agent to maintain each component uniformly dispersed therein. The surface active agent may be selected from anionic or nonionic surface active agents. Typical examples thereof are sodium dodecylbenzenesulfonate, polyoxyethylene lauryl ether. Such surface active agent may be present in an amount of 0.1 – 1 percent by weight, preferably 0.2 – 0.5 percent by weight based on the aqueous dispersion of the adhesive with the rubber particles dispersed therein.

The thus-obtained fluid lining agent has a viscosity of preferably 230 – 1,350 cps at a temperature of 21°C, to yield desired fluidity as well as wheel balance.

Further the lining agent of the invention, though it fully resists high temperatures up to about 250°C, may suitably contain an anti-freezing agent to prevent freezing of the composition under cold conditions. Such an antifreezing agent may be ethylene glycol or diethylene glycol and may be present in an amount of 0.5 –1.5 percent by weight based on the adhesive thereby to lower the freezing point of the lining agent as low as −20°C.

The lining agent to be employed in the invention is readily handled and may be simply charged into a tire and may be charged into an ordinary tube-containing tire in place of the tube, thereby enabling a tire to be pumped up in the usual manner and to be substantially protected from puncture trouble.

Referring now to the drawing, the operation for applying the lining agent of this invention to a tire is explained. The lining agent is introduced into the interior of an ordinary tire 1 fitted on a rim 2 in an amount approximately equivalent to the weight of a conventional inner tube. Subsequently, the tire 1 is inflated to a suitable pneumatic pressure and the wheel is gently rotated to thereby spread the fluid lining agent over the inner surface of the tire. As a result, not only the inner surface of the tire but a contact portion of the tire with the rim is entirely covered with an airtight layer or film 3 composed of an adhesive dispersion 5 and rubber particles 4.

Therefore, a highly qualified tubeless tire can be easily obtained by removing a tube from an ordinary tire containing an inner tube and equipping the rim with an inflating valve for a conventional tubeless tire and by applying the above method to the thus-produced tire. Further, the lining agent of this invention can be employed as an auxiliary puncture resisting agent for a conventional tubeless tire to enable puncture troubles to be completely eliminated.

Following the above-described handling, a portion of water contained in the lining agent evaporates to form a thin solid film. The evaporation stops in a moment since the interior of the tube becomes saturated with vapor and the other portion of water remains in the lining agent to keep the agent almost permanently fluid in the tire.

In operation, when tubeless tire 1 is holed, e.g. by picking up a nail, rubber particles 4 dispersed in adhesive dispersion 5 (kept fluid) will immediately enter the hole under the influence of the pressure in the tire as well as by the action of centrifugal force and, at the same time, be firmly attached thereto by the bonding action of the adhesive agent of the dispersion which is exposed to the air and solidified thereby to completely seal the hole. Thus, the tubeless tire maintains its airtightness, ensuring avoidance of puncture trouble. In this connection, it is to be noted that the use of rubber particles in the lining agent of the present invention contributes to the effectiveness of the present agent in, not only sealing the hole sealed, but maintaining the elasticity of the tire.

As described, the present invention has made it possible for the first time in the field to render a tubeless tire perfectly resistant to puncturing and thus it makes a great contribution from an industrial point of view.

In order that the invention may be better understood, the following Examples are given by way of illustration.

Example 1

The lining agent prepared from the following ingredients was introduced into the interior of a tire which was then treated by inflation as above described. Three nails of 15cm in length were thrusted into the thustreated tire and withdrawn therefrom after one minute, after 1 day and after 1 month respectively. Respective holes were sealed up the instant the respective nails were withdrawn and no leakage of air was observed thereafter.

1. TOABOND N0. 2,100 (the trade name of a transparent polyvinyl acetate adhesive aqueous emulsion having a p.v.a. concentration of 37.5 percent by weight, a viscosity of 15,000 cps at 20°C. and a pH of 4 manufactured by Toa Paint Co., Ltd.) 1,000 g.
2. Water 200 g.
3. Rubber particles (pulverized waste tire rubber of about 50 to about 1,200 microns particle size) 150 g.
4. BIKKU (the trade name of a surface active agent consisting essentially of sodium dodecylbenzenesulfonate, manufactured by Kao Soap Co., Ltd.) 3g.

The above ingredients were mixed and stirred sufficiently to give a desired fluid lining agent.

Example 2

The fluid lining agent prepared from the following ingredients was introduced into the interior of a tire which was then treated by inflation as above described. The thus treated tire was tested in the same way as in Example 1 to obtain the same results.

1. TOABOND No. 40H (substantially the same as in Example 1 except that the p.v.a. concentration is 29.0 percent by weight and the viscosity is 13,00 cps at 20°C.
   1,000g.
2. Water
   500g.
3. Rubber particles (the same as in Example 1)
   170g.
4. BIKKU (the same as in Example 1)
   3g.

Those ingredients were mixed and stirred sufficiently to give a desired fluid lining agent.

Example 3

The fluid lining agent prepared from the following ingredients was introduced into the interior of a tire which was then treated by inflation as above described. The thus treated tire was tested in the same way as in Example 1 to obtain the same results. A further nail was thrusted into the tire and withdrawn after 12 months. A hole made by said nail was instantly sealed up and no leakage of air was observed thereafter. The obtained lining agent did not freeze at a freezing test carried out at a temperature of −20°C.

1. TOABOND No. 6,100 (substantially the same as in Example 1 except that the p.v.a. concentration is 31.5 percent and the viscosity is 15,000 cps. at 20°C.
   1,000g.
2. Water
   400g.
3. Rubber particles (the same as in Example 1)
   130g.
4. BIKKU (the same as in Example 1)
   5g.
5. EPAN No. 420 (the trade name of an anti-freezing agent of diethylene glycol having a specific gravity of 1.1186 at 20°C and a pH of 7.0 manufactured by Dai-ichi Kogyo Kabushiki Kaisha)
   10g.

Those ingredients were mixed and stirred sufficiently to give a desired fluid lining agent.

Example 4

In order to demonstrate the effect of the present fluid lining agent, tubeless tires charged with the lining agent prepared in the same way as in Example 1 were attached to a motor-car, through the running of which the puncture-preventing property as well as the durability were examined. The results are summarized in the following table.

Table

| | | |
|---|---|---|
| Motor Car | | Name : Nissan Cedric<br>Type : 66' Type 130<br>Fuel : L.P.G. |
| Lining Agent | Date of Charge | May 20, 1967 |
| | Charging volume | 5,000 g. to four wheels (about 1,250 g. per tire) |
| Tire | | Name : Toyo Tire<br>Size : 700/13<br>Fly : 6 P |
| Testing term | | From May 20, 1967 to September 7, 1967 (for 111 days) |
| Total running distance | | 41,351 km |
| Puncture and other accidents | | Nothing |

While several embodiments of the invention have been shown and described, other variations will be readily apparent to those skilled in the art. Therefore, the invention is not limited to these embodiments but is intended to cover all such variations as may be within the scope of the invention defined by the following claims:

What is claimed is:

1. A tire lining agent capable of rendering a vehicle tire puncture proof when placed in the interior of said vehicle tire, said tire lining agent being an aqueous dispersion which comprises:
   a. an adhesive consisting essentially of an aqueous emulsion of polyvinyl acetate, polyacrylic acid ester, butadiene-acrylonitrile rubber, polychloroprene or polychloroprene copolymer, said aqueous emulsion being
      i. dispersible in water; and
      ii. adhesive to finely divided particulate solid rubber particles, 100 parts of said aqueous emulsion being present per 18 to 54 parts of water; and
   b. finely divided particulate solid rubber particles intimately dispersed in said aqueous dispersion, said finely divided particulate solid rubber particles having a particle size of from about 50 to 1200 microns and being present in an amount sufficient to seal a small puncture hole is said vehicle tire, said finely divided particulate solid rubber particles (b) having been derived from rubber in its dry state which, upon addition to said aqueous emulsion, remains in a state characteristic of its dry state whereby said finely divided particulate solid rubber particles (b) are capable of rendering a vehicle tire puncture proof when placed in the interior of said vehicle tire, said finely divided particulate solid rubber particles (b) being uniformly dispersed in said adhesive (a) through the incorporation in said tire lining agent of an effective amount of an anionic or nonionic surface active agent, said effective amount being sufficient to effect the uniform dispersion of said finely divided particulate rubber particles in said aqueous dispersion.

2. A tire lining agent of claim 1, wherein said aqueous emulsion (a) contains polymethyl methacrylate.

3. A tire lining agent according to claim 1 wherein said agent exhibits a viscosity of about 230 to 1350 cps at 21°C.

4. A tire lining agent according to claim 2 wherein said surface active agent is present in an amount of about 0.1 to to 1 percent by weight based on the aqueous dispersion of the adhesive with the rubber particles dispersed therein.

5. A tire lining agent according to claim 4 wherein said surface active agent is present in an amount of about 0.2 to 0.5 percent by weight based on the aqueous dispersion of the adhesive with the rubber particles dispersed therein.

6. A tire lining agent according to claim 5 wherein said surface active agent is sodium dodecylbenzenesulfonate or polyoxyethylene lauryl ether.

7. A tire lining agent according to claim 1 further comprising an anti-freezing agent.

8. A tire lining agent according to claim 7 wherein said anti-freezing agent is present in an amount sufficient to lower the freezing point of said tire lining agent to about −20°C.

9. A tire lining agent according to claim 7 wherein said anti-freezing agent is present in an amount of about 0.5 to 1.5 percent by weight based on the adhesive.

10. A tire lining agent according to claim 7 wherein said anti-freezing agent is ethylene glycol or diethylene glycol.

11. A tire lining agent of claim 1, wherein said amount sufficient to seal a small puncture is from about 5 to 20 percent by weight based on said aqueous dispersion.

12. A tire lining agent of claim 11, wherein said amount sufficient to seal a small puncture is from about 7 to 18 percent by weight based on said aqueous dispersion.

* * * * *